May 29, 1956  G. L. MILLER  2,748,334
VARIABLE SPEED INDUCTION MOTOR
Filed Feb. 6, 1953  2 Sheets-Sheet 1
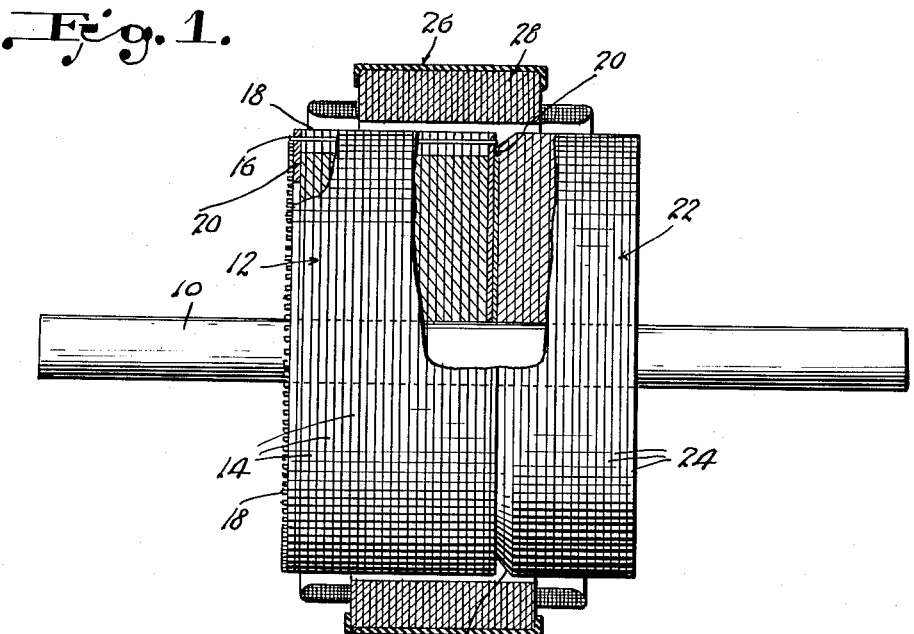
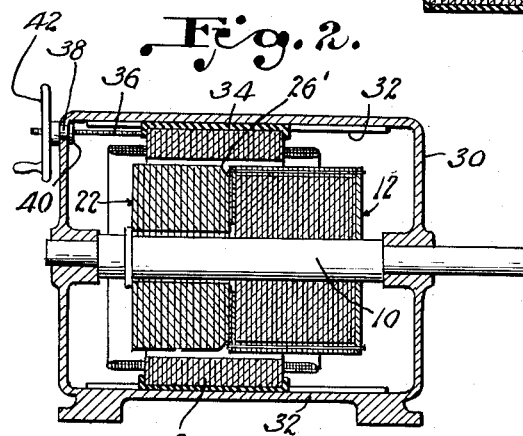
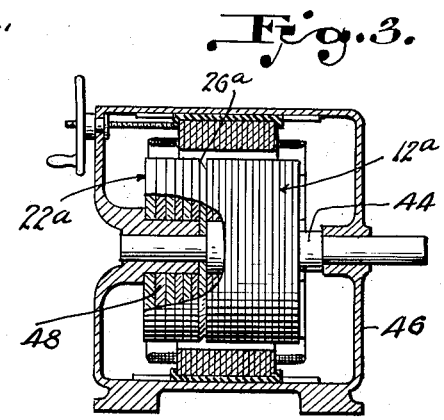
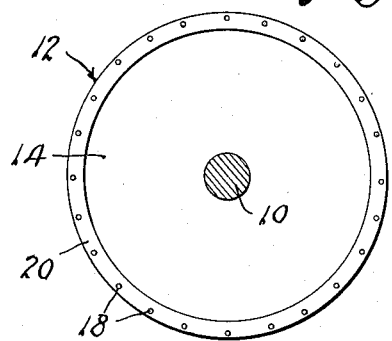
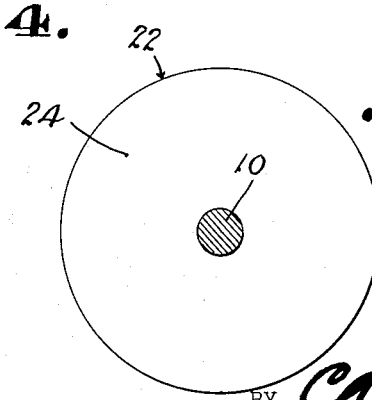
George L. Miller
INVENTOR
BY *CAKnowles*
ATTORNEYS.

May 29, 1956  G. L. MILLER  2,748,334
VARIABLE SPEED INDUCTION MOTOR
Filed Feb. 6, 1953  2 Sheets-Sheet 2
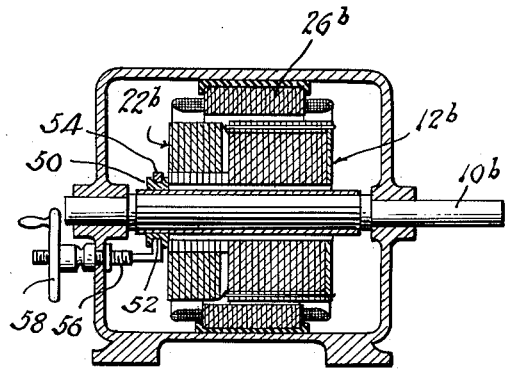
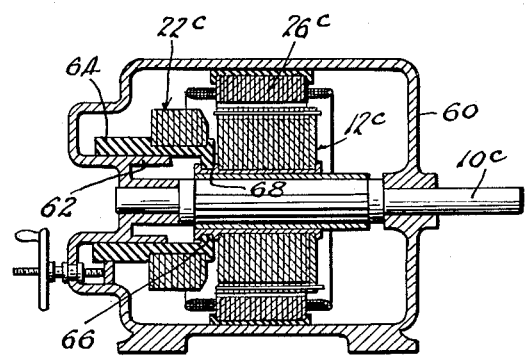
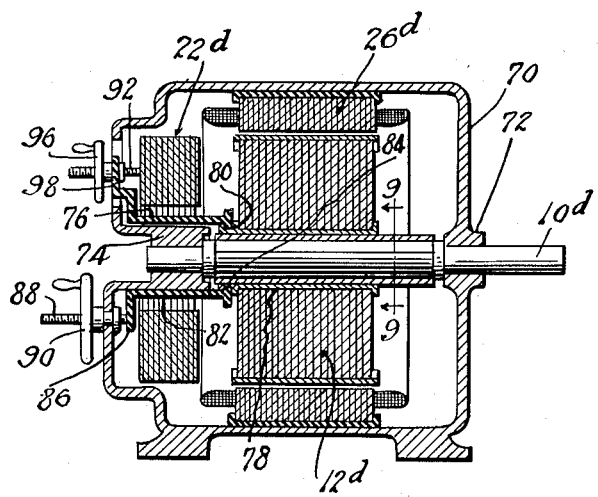
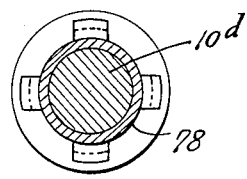
George L. Miller
INVENTOR
BY
ATTORNEYS.

United States Patent Office 2,748,334
Patented May 29, 1956

2,748,334

VARIABLE SPEED INDUCTION MOTOR

George L. Miller, Hackensack, N. J., assignor of one-half to Frederick J. Miller, Hackensack, N. J.

Application February 6, 1953, Serial No. 335,419

3 Claims. (Cl. 318—243)

This invention relates to a variable speed induction motor and has for its primary object to enable the speed of an alternating current induction motor to be varied.

Another object is to control the power consumed in accordance with the speed at which the motor operates.

The above and other objects may be attained by employing this invention which embodies among its features a rotor mounted to rotate about a common axis, a mass of magnetically responsive material mounted adjacent the rotor in axial alignment therewith, a stator symmetrically disposed about the common axis for movement longitudinally therealong and means carried by the rotor connected to the stator for establishing longitudinal movement between the rotor and stator for introducing inactive magnetically responsive material into the magnetic circuit for reducing the speed of rotation of the rotor.

Other features include means for shifting the rotor longitudinally relative to the stator for varying the amount of magnetically responsive material introduced into the magnetic field, and means for moving the mass of magnetically responsive material relative to the rotor. Still other features include in an induction motor of the type having a rotor and a stator, a mass of magnetically responsive material mounted adjacent the rotor and means for establishing movement between the rotor, mass of magnetically responsive material and stator by which the mass of magnetically responsive material may be introduced into the magnetic circuit of the stator to replace the mass of rotor extracted from the magnetic circuit.

In the drawings

Fig. 1 is a view partly in section of an induction motor showing the rotor partially withdrawn from the magnetic circuit of the stator and a mass of magnetically responsive material substituted for the withdrawn portion of the rotor.

Fig. 2 is a longitudinal sectional view through one form of the invention,

Fig. 3 is a view similar to Fig. 2 through a device embodying another form of the invention, Fig. 4 is a section view through the rotor shaft showing the end of othe rotor, Fig. 5 is a view similar to Fig. 4 showing the end of the mass of magnetically responsive material, Fig. 6 is a view similar to Figs. 2 and 3 showing a further modified form of motor, Fig. 7 is a longitudinal sectional view through a further modified construction of motor, Fig. 8 is a view similar to Fig. 7 through a still further modification of motor construction, and Fig. 9 is an enlarged sectional view taken substantially on the line 9—9 of Fig. 8.

Referring to the drawings in detail a rotor shaft 10 has attached thereto a conventional squirrel cage induction rotor 12 comprising laminae 14 having circumferentially spaced peripheral grooves 16 in which conventional conductor bars 18 are seated. Short circuiting rings 20 are conventionally carried by the rotor 12 adjacent opposite ends thereof, and the conductor bars 18 are connected to these short circuiting rings in a conventional manner. The rotor thus described is of conventional form such as is commonly employed in a conventional squirrel cage induction motor of the type to which this invention relates. Mounted on the shaft 10 and abutting one end of the rotor 12 is a mass designated generally 22 of a magnetically responsive material which preferably comprises a series of laminae 24 which are carried by the shaft and the peripheries of the laminae 24 adjacent the rotor 12 are cut away to form an annular groove or gap 26 which extends around the periphery of the mass 22 as will be readily understood upon reference to Fig. 1. A conventional stator 26 encircles the shaft 10 and is equipped with conventional induction windings 28 which encircle the rotor 12 in spaced relation thereto as will be readily understood upon reference to Fig. 1. Obviously in this structure, the rotor and mass 12 and 22 respectively may be shifted longitudinally of the axis of the shaft 10 so that the stator 26 wholly encloses the rotor 10 or so that the mass 22 or a portion thereof may be brought wholly within the magnetic field created by the stator 26 when the latter is excited. Obviously the overhang of the stator relative to the mass 22 may be varied either by shifting the rotor and mass longitudinally of the axis of the shaft, or by shifting the stator 26 longitudinally relative to the axis of the shaft.

In one form of the invention illustrated in Fig. 2, the shaft 10 is shown as being journalled in the bearings within a housing 30 between which bearings the rotor 12 and mass 22 rotate without longitudinal movement. In this structure, the stator designated generally 26 is mounted to move longitudinally on tracks 32 within the housing relative to the longitudinal axis of the shaft 10 so as to wholly encircle the stator at which time the motor is operating at full speed or to partially or wholly encircle the mass 22 at which time the motor will operate at a reduced speed. The stator 20 is mounted in a carriage 34 which slides longitudinally in the tracks 32 and is threadedly engaged by a threaded bar 36 which is mounted for movement in an opening 38 formed in the housing 30 and is held against longitudinal shifting movement in said opening by a collar 40 and a hand wheel 42 by which the shaft 36 may be rotated to adjust the stator 20 longitudinally within the housing and with relation to the longitudinal axis of the shaft 10.

In the modification illustrated in Fig. 3 a shaft 44 is mounted in bearings carried by a housing 46 for rotation about its longitudinal axis and carries a rotor designated generally a which corresponds in all respects to the rotor 12. In this type of construction one of the bearings supporting the shaft 44 for rotation is provided with an elongated sleeve 48 on which is mounted the mass of magnetically responsive material designated generally 22a which corresponds in all respects to the mass 22 previously described. The stator 26a surrounds the rotor and the shaft 44 and is shiftable longitudinally within the housing 46 from a position in which it wholly encircles the rotor to a position in which it wholly encircles the mass, in which latter position, the speed of rotation of the rotor is reduced. In this structure it is obvious that the mass need not and in fact does not rotate with rotor 12a and hence the shaft 44 is not subjected to carrying the weight of the mass 22a.

In the modifications illustrated in Figs. 6 through 9 inclusive, the rotors 12b, 12c and 12d are mounted on their respective shafts 10b, 10c and 10d to move longitudinally thereon while the stators 26b remain stationary. In the structure illustrated in Fig. 6 the mass of magnetically responsive material 22b is secured to the rotor 12b to move longitudinally therewith along the shaft 10b and supporting said rotor and said mass is a sleeve 50 carrying adjacent one end a head having an annular groove 52 extending therearound in which a collar 54 is fitted. This collar carries a threaded arm 56 which projects through the motor casing and threadedly engages a hand wheel 58 by means of which the collar and the mass, together with its respective rotor 12b may be shifted longitudinally on the shaft 10b to move the rotor and mass into and out of the magnetic field of the stator 26b. In this particular form of the invention, the shaft 10b is designed not only to carry the weight of the rotor 12b but also of the mass 22b.

In some instances it is desirable that the weight of the mass 22 be supported independently of the shaft 10 and to this end the motor housing 60 of the motor illustrated in Fig. 7 is provided adjacent opposite ends with bearings for the reception of the shaft 10c and carried by one of the bearings is an elongated cylindrical bearing surface 62 on which a sleeve 64 is mounted to slide. As illustrated in Fig. 7, the rotor 12c slides longitudinally on the shaft 10c and carries adjacent one end a grooved collar 66 into which extends a flange 68 carried by the sleeve 64 so that as the rotor 12c moves longitudinally on the shaft 10c, the sleeve 64 will likewise move on its cylindrical guide 62. In this structure the mass of magnetically responsive material 22c is carried on the sleeve 64 to move longitudinally along the axis of the shaft 10c as the rotor moves into and out of the magnetic field of the stator 26c.

In the modification illustrated in Fig. 8, the motor housing 70 is provided adjacent one end with a conventional bearing 72 and adjacent its opposite end with an inwardly extending bearing 74 which provides an inwardly extending guide surface 76. The stator 26d is fixed within the housing in surrounding relation with the motor shaft 10d which is mounted in the bearings 72 and 74 respectively and carries intermediate its ends a splined guide sleeve 78 on which the rotor 12d is mounted for longitudinal sliding movement but driving connection with the shaft 10d. The sleeve 78 carries adjacent the end of the guide 74 a grooved flange 80 and mounted on the guide surface 76 of the bearing 74 is a sleeve 82 carrying an annular flange 84 which projects into the grooved sleeve 80 so as to cause the sleeve 82 to move longitudinally along the axis of the shaft 10 when the rotor 12d moves thereon. A laterally extending arm 86 is carried by the sleeve 82 adjacent the end thereof remote from the flange 84 and has rigidly mounted therein a threaded rod 88 which projects through the wall of the housing 70 and is threadedly engaged by a hand wheel 90. The hand wheel is held against longitudinal movement relative to the housing but is rotatable therein so that upon turning the hand wheel, the rod 88 will shift the sleeve 82 longitudinally of the axis of the shaft 10d.

Mounted for longitudinal sliding movement on the sleeve 82 is a mass 22d of magnetically responsive material to which is connected one end of a screw 92 which projects through an opening 94 in the housing 70 and is threadedly engaged by the hand wheel 96 which is mounted for rotation but held against longitudinal movement in an arm 98 carried by the sleeve 82. It will thus be seen that by turning the hand wheel 96, the mass 22d may be advanced or retracted relative to the rotor 12d in order to adjust the gap or space between the rotor and mass.

In use it will be obvious that upon exciting the stator 26, with the rotor 12 wholly within the magnetic field of influence of the stator, the rotor will rotate at full speed then cause the shaft 10 to rotate. Should a reduction of speed be desired, the rotor 12 is partially withdrawn from the influence of the stator and the mass 22 is shifted to substitute for the mass of rotor that has been withdrawn to thereby introduce inactive iron into the magnetic circuit to limit the power consumed at the reduced speed. Obviously the device may be employed for starting an induction motor by fully introducing the inactive magnetically responsive mass into the stator and gradually withdrawing it and replacing the portion or portions withdrawn by the rotor until the rotor is wholly within the stator and the full magnetic influence of the stator is exerted on the rotor to cause the motor to operate at the highest speed.

While in the foregoing there has been shown and described the preferred embodiment of this invention it is to be understood that minor changes in the details of construction combination and arrangement of parts may be resorted to without departing from the spirit and scope of the invention as claimed.

Instances of such departure apply to the design of the heavy, larger type motors which may require lamination of the copper short-circuiting ring located adjacent to the inactive iron section, to reduce heating at this point at reduced speed. Also, in large machines, the inactive iron section may in some cases be allowed to float "rotationwise" on its support in order to reduce starting inertia.

What is claimed is:

1. In a variable speed induction motor a stator disposed about a common axis, a rotor mounted within the stator to rotate about the common axis and to move longitudinally along said axis from a position wholly within said stator to a position in which it is partially withdrawn from said stator, a mass of magnetically responsive metal mounted adjacent said rotor to move longitudinally therewith from a position wholly within the stator to a position wholly without said stator, and means carried by the stator and operatively connected to the rotor for moving the rotor longitudinally along said axis, and means carried by the rotor moving means for moving the mass longitudinally along said axis relative to the rotor.

2. In a variable speed induction motor, a motor housing, aligned bearing hubs carried by the housing, an elongated shaft mounted in said bearing hubs to rotate about its longitudinal axis, a stator encircling the shaft within the housing, a rotor mounted on said shaft for rotation therewith and movement longitudinally therealong from a position wholly within the stator to a position in which it is partially withdrawn from the stator, a sleeve mounted on one of said hubs for movement longitudinally thereon, said sleeve being connected to said rotor for movement therewith longitudinally relative to the shaft, a mass of magnetically responsive material mounted on the sleeve, an arm extending from said sleeve having an opening, a screw extending from said mass passing through the opening of said arm, a hand wheel having a threaded opening mounted on said arm to move therewith, and said screw being movable through said threaded opening moving said mass longitudinally of the sleeve independently of said rotor.

3. In a variable speed induction motor, a motor housing, aligned bearing hubs carried by the housing, a shaft mounted in said bearings to rotate about its longitudinal axis, a stator encircling the shaft within the housing, a rotor mounted on the shaft for rotation therewith, a sleeve mounted for rotation on one of said hubs, said sleeve having swivel connection with said rotor, means for moving the sleeve and rotor longitudinally of the shaft, a mass of magnetically responsive material mounted on said sleeve, and means for adjusting said mass of magnetically responsive material longitudinally of said sleeve and with respect to the rotor and stator, independently of said rotor.

References Cited in the file of this patent

UNITED STATES PATENTS

| 514,902 | Bradley | Feb. 20, 1894 |
| 1,919,774 | Chew | July 25, 1933 |

FOREIGN PATENTS

| 495,589 | Belgium | Sept. 1, 1950 |
| 19,025 | Sweden | Nov. 10, 1903 |